Patented Dec. 27, 1949

2,492,939

UNITED STATES PATENT OFFICE 2,492,939

COMPLEX SALTS OF STABILIZED ROSIN AMINE

Glenwood L. Schertz, Wilmington, Del., assignor to Hercules Powder Company, Wilmington, Del., a corporation of Delaware No Drawing. Application January 15, 1947, Serial No. 722,285

11 Claims. (Cl. 260—100)

This invention relates to complex metal ammine salts and more particularly to complex metal ammine salts of stabilized rosin amines and complexogen metal salts.

Now in accordance with this invention, it has been found that complex metal ammine salts having powerful fungicidal and mildewicidal properties are provided by the reaction between complexogen metal salts and stabilized rosin amines such as dehydrogenated rosin amine, disproportionated rosin amine, and hydrogenated rosin amine. It has furthermore been found that resinous complex metal ammine salts of these stabilized rosin amines are produced by reacting at least two molecular proportions of the amine with one of a complexogen metal salt by mixing the amine and the complexogen metal salt together until a homogeneous resinous complex is formed. If a solvent is used, the resinous complex may be isolated by evaporation of the solvent. Fabrics impregnated with small amounts of these complex metal ammine salts are highly resistant to rot when buried in infected soil.

The method of preparation of these complex metal ammine salts is illustrated by the following examples in which all parts and percentages are by weight.

Example 1

Twenty-eight and four-tenths parts hydrogenated rosin amine in the form of a pale yellow viscous liquid was dissolved in 70 parts Varsol and 10 parts cupric acetate monohydrate was added to the solution. The mixture was heated to 60° C. and a deep blue solution formed as the cupric acetate dissolved. A deep blue resinous complex copper ammine salt of hydrogenated rosin amine and copper acetate was isolated by evaporation of the solvent. By removing the solvent in vacuo, the resinous product was obtained in a form which readily powdered on crushing.

The resinous complex was tested as a mildewicide in compositions for preserving fabrics and was found to impart powerful mildewicide characteristics to the fabric. It is especially useful in compositions containing chlorinated paraffin for fireproofing canvas and the like because of its stabilizing action on the chlorinated paraffin.

Example 2

To 235 parts disproportionated rosin amine in 539 parts Varsol was added 77 parts cupric acetate. A homogeneous solution was obtained by warming to about 60° C. A sample of canvas was protected against rot by dipping in this solution, squeezing out excess solution and evaporating the solvent so that the canvas was impregnated with about 4% of the resinous complex metal ammine salt.

Example 3

To 62 parts disproportionated rosin amine in 160 parts dry carbon tetrachloride was added 13.6 parts anhydrous zinc chloride. The mixture was heated at about 78° C. for about one-half hour and then cooled to room temperature. A small amount of insoluble material which separated was removed by filtration. The solvent was then removed from the filtrate to obtain a pale amber resin. This resin when taken up in one-half its weight of carbon tetrachloride and diluted with an equal weight of hexane yielded at 3° C. a gelatinous precipitate which after removal by filtering and subsequently drying was a white powder. This white powder contained 8.8% zinc, 10.2% chlorine, and 3.67% nitrogen which corresponds to that for a zinc chloride complex having two molecules of disproportionated rosin amine in the molecule.

A similar product was obtained from dehydrogenated rosin amine and anhydrous zinc chloride in ethanol solvent. Crystals which separated from ethanol at room temperature melted at 100–108° C.

Example 4

Twelve hundred parts dehydrogenated rosin amine and 391 parts cupric acetate monohydrate were heated together at about 78° C. in 1000 parts ethanol for two hours. The solvent was evaporated in vacuo to obtain a dark brittle blue resin having a capillary melting point within the range of 70–76° C.

Example 5

Twelve and two-tenths parts dehydrogenated rosin amine and 3.6 parts anhydrous copper acetate were heated at 110° C. with stirring for ten minutes. The resulting deep blue resin which hardened at about 80° C. had a capillary melting point of about 70–80° C.

Example 6

A solution of 122 parts dehydrogenated rosin amine in 500 parts anhydrous alcohol was heated with 36.7 parts zinc acetate for two hours at about 75–78° C. The resulting solution was filtered to clarify and the solvent was then removed in vacuo to obtain the resinous brittle amber complex salt which melted at about 79–84° C. (capillary).

Example 7

A solution of 122 parts dehydrogenated rosin amine in 300 parts anhydrous alcohol and 22.2 parts calcium chloride were heated together for about one-half hour. The resulting solution was filtered to remove a slight turbidity and the solvent was then evaporated to isolate the resinous complex salt which melted at 180–200° C. (capillary).

Example 8

To a solution of ten parts of the zinc acetate complex of dehydogenated rosin amine produced according to Example 6 was added 1.3 parts sulfuric acid dissolved in 20 parts ethanol. A flocculent precipitate which formed was isolated. It amounted to six parts and melted at about 240° C. (capillary).

Example 9

To a solution of ten parts of the copper acetate complex of dehydrogenated rosin amine produced according to Example 4 was added 2.2 parts sulfuric acid in 20 parts ethanol. The greenish white powder which separated amounted to nine parts and melted above 250° C.

Example 10

A solution of aluminum chloride in ethanol was made by gradually adding 26.7 parts anhydrous aluminum chloride to 240 parts ethanol with cooling. To this solution was then added 122 parts dehydrogenated rosin amine in 160 parts carbon tetrachloride. The resulting solution was heated at 75° C. for two hours and the solvent was then removed in vacuo. The residue was a whitish grey resin, melting point 230–235° C. (capillary).

Example 11

To 100 parts dehydrogenated rosin amine in 230 parts ethanol was added 26 parts chromium chloride. The mixture was refluxed four hours and cooled. Solid precipitate which formed was separated. It amounted to 54 parts and was greenish brown in color and melted at 220–240° C. The filtrate was isolated as a resinous residue having a greyish cast by evaporation of the solvent. This residue melted at 197–204° C. (capillary).

Examples 12–16

[Procedure according to Example 6]

| Example | Complexogen Metal Salt | Complex Containing Two Moles Dehydrogenated Rosin Amine |
| --- | --- | --- |
| 12 | Hg(O$_2$C$_2$H$_3$)$_2$ | Brown resin which yields white needlelike crystals, melting point 113–116° C. |
| 13 | Ca(O$_2$C$_2$H$_3$)$_2$ | Amber resin only partially soluble in ethanol. |
| 14 | FeCl$_3$ | Brown resin only partially soluble in ethanol. |
| 15 | Co(O$_2$C$_2$H$_3$)$_2$ | Bluish black resin only partially soluble in ethanol. |
| 16 | Mn(O$_2$C$_2$H$_3$)$_2$ | Greyish black resin only partially soluble in ethanol. |
| 17 | AgNO$_3$ | Greyish amber resin which yielded white crystals, melting point 143–147° C. |

The stabilized rosin amines used for conversion into the complex metal ammine salts of this invention are primary amines which may be prepared from dehydrogenated rosin, disproportionated rosin, or hydrogenated rosin by first reacting with ammonia to form the nitrile and then hydrogenating the nitrile to the amine. The step of making the nitrile may be carried out by passing gaseous ammonia into the molten rosin material and vaporizing the water as fast as it is formed or by heating the rosin material and ammonia in the presence of a dehydration catalyst. The nitrile is preferably purified by alkali extraction or by distillation to remove unconverted acids prior to hydrogenation to the amine, since the acidic materials frequently destroy the activity of the hydrogenation catalyst. The hydrogenation of the nitrile may be carried out in the presence or absence of a solvent and in the presence or absence of ammonia. The catalyst may be any of the well-known hydrogenation catalysts such as Raney nickel, Raney cobalt, activated nickel, cobalt, palladium or platinum, etc., and supports may be used if desired. The hydrogenation is usually carried out under a pressure of about 200 to about 8,000 pounds per square inch at a temperature of about 20° C. to about 200° C.

By the term "stabilized rosin amine" is meant a rosin amine having the ring structure of a stabilized rosin acid such as dehydroabietic acid, dihydroabietic acid, or tetrahydroabietic acid, or a mixture of such rosin amines. The term "disproportionated rosin amine" is intended to cover a mixture which is chiefly dehydro- and dihydro-rosin amines.

By the term "complexogen metal salt" is meant a metal salt which is capable of forming complexes with ammonia. Such salts are, for example, salts of the cations—Cu, Zn, Cr, Hg, Ag, Al, Mn, Fe, Co, Ni, Ca, Cd, and the anions—acetate, nitrate, chloride, bromide, iodide, fluoride, propionate, stearate, sulfate. The preferred complexogen metal salts are the acetates and chlorides of Cu, Cr, and Zn.

The formation of the complex metal ammine salts of this invention does not appear to be dependent upon any particular temperature, sufficient temperature to effect a solution of the complexogen metal salt being adequate. In some instances, it may be desirable to use a solvent to facilitate the dissolution of the complexogen metal salt. Solvents which are operable include the lower alcohols, chloroform, carbon tetrachloride, hexane, benzene, naphtha, toluene, and xylene. The complex metal ammine salts of this invention may be recovered in solid form as resins or crystals from the solution in which they were made or they may be used directly in the solution in which they were made.

In some instances the anion portion of the complex metal ammine salt may be exchanged for other anions. Examples of such an exchange are given in Examples 8 and 9. The anion may also be added in the form of a soluble salt instead of the form of an acid as in these examples.

While the crystalline complex metal ammine salts of stabilized rosin amines have been found to have a maximum of two stabilized rosin amine molecules in the complex molecule, it is believed that in some instances more stabilized rosin amine molecules may be loosely bound in the complex by weak coordinate linkages especially in the case of the resinous complexes made by combination of a complexogen metal salt with an excess (for example, three to six moles) of stabilized rosin amine. It is preferable, however, even in the case of the resinous complex metal ammine salts of this invention to use a ratio of two moles stabilized rosin amine to one mole of complexogen metal salt. The complex metal ammine salts of stabilized rosin amines have all been found to be active as mildewicides and fungicides and to be useful for preventing rot in cotton, hemp, leather, wood, rubber, fabrics, cord, rope, etc. The complex metal ammine salts of Cu, Zn, Cr, Hg, and Fe are particularly effective in this application. The copper ammine acetate of dehydrogenated rosin, for instance when incorporated in canvas to give a 0.5% copper content completely prevented rot in the canvas sample while buried in infected soil for a six-week period, while a sample of canvas containing the same amount of copper in the form of a naphthenate lost 42% of its warp breaking strength in a similar period under the same conditions. These materials are particularly effective when used in conjunction with chlorinated hydrocarbon flame inhibitors since they are effective as stabilizers for the chlorinated hydrocarbon.

The rosin amine complex salts which are soluble in organic solvents are of especial interest because they provide a convenient method for impregnating materials such as cloth, rope, etc., with the complex metal ammine salts. The resinous complex is left in the material treated by evaporation of the solvent. The complex metal ammine salts of stabilized rosin amines are insoluble in water and are not leached out by soaking or by the action of rain.

The zinc chloride, copper acetate, and silver nitrate complexes of this invention are useful as fungicides on plants. The zinc acetate complex is useful in rubber compounding. The chromium chloride complex is useful in tanning and preserving of leather. Rosin amine complexes are also useful in asphalt compositions having improved adhesion to stone and in lubricating oils having improved adhesion to metal, in metal corrosion inhibitors, and in paint and varnish compositions.

The preferred complex metal ammine salts from the standpoint of general utility are those containing copper, chromium or zinc, and the chloride or acetate anion, and dehydrogenated rosin amine.

What I claim and desire to protect by Letters Patent is:

1. As a new composition of matter a complex metal ammine salt of a stabilized rosin amine and a complexogen metal salt prepared by reacting at least two molecular proportions of a stabilized rosin amine with one molecular proportion of a complexogen metal salt of the group consisting of the acetate, nitrate, chloride, bromide, iodide, fluoride, propionate, stearate, and sulfate of the metals copper, zinc, chromium, mercury, silver, aluminum, manganese, iron, cobalt, nickel, calcium, and cadmium.

2. As a new composition of matter a complex metal ammine salt of a disproportionated rosin amine and a complexogen metal salt prepared by reacting at least two molecular proportions of a disproportionated rosin amine with one molecular proportion of a complexogen metal salt of the group consisting of the acetate, nitrate, chloride, bromide, iodide, fluoride, propionate, stearate, and sulfate of the metals copper, zinc, chromium, mercury, silver, aluminum, manganese, iron, cobalt, nickel, calcium, and cadmium.

3. As a new composition of matter a complex metal ammine salt of a hydrogenated rosin amine and a complexogen metal salt prepared by reacting at least two molecular proportions of a hydrogenated rosin amine with one molecular proportion of a complexogen metal salt of the group consisting of the acetate, nitrate, chloride, bromide, iodide, fluoride, propionate, stearate, and sulfate of the metals copper, zinc, chromium, mercury, silver, aluminum, manganese, iron, cobalt, nickel, calcium, and cadmium.

4. As a new composition of matter a complex metal ammine salt of a dehydrogenated rosin amine and a complexogen metal salt prepared by reacting at least two molecular proportions of a dehydrogenated rosin amine with one molecular proportion of a complexogen metal salt of the group consisting of the acetate, nitrate, chloride, bromide, iodide, fluoride, propionate, stearate, and sulfate of the metals copper, zinc, chromium, mercury, silver, aluminum, manganese, iron, cobalt, nickel, calcium, and cadmium.

5. As a new composition of matter a complex copper ammine salt of dehydrogenated rosin amine and a copper salt prepared by reacting at least two molecular proportions of a dehydrogenated rosin amine with one molecular proportion of a copper salt.

6. As a new composition of matter a complex chromium ammine salt of dehydrogenated rosin amine and a chromium salt prepared by reacting at least two molecular proportions of a dehydrogenated rosin amine with one molecular proportion of a chromium salt.

7. As a new composition of matter a complex zinc ammine salt of dehydrogenated rosin amine and a zinc salt prepared by reacting at least two molecular proportions of a dehydrogenated rosin amine with one molecular proportion of a zinc salt.

8. The method of producing a resinous complex metal ammine salt of a stabilized rosin amine and a complexogen metal salt which comprises mixing at least two molecular proportions of a stabilized rosin amine with one molecular proportion of a complexogen metal salt of the group consisting of the acetate, nitrate, chloride, bromide, iodide, fluoride, propionate, stearate, and sulfate of the metals copper, zinc, chromium, mercury, silver, aluminum, manganese, iron, cobalt, nickel, calcium, and cadmium, until a homogeneous resinous complex is formed.

9. The method of producing a resinous complex metal ammine salt of a stabilized rosin amine which comprises mixing at least two molecular proportions of a stabilized rosin amine dissolved in an inert solvent therefor with one molecular proportion of a complexogen metal salt of the group consisting of the acetate, nitrate, chloride, bromide, iodide, fluoride, propionate, stearate, and sulfate of the metals copper, zinc, chromium, mercury, silver, aluminum, manganese, iron, cobalt, nickel, calcium, and cadmium, until a homogeneous solution is produced and then evaporating the solvent to leave the resinous complex as a residue.

10. The method of producing a resinous complex metal ammine salt of a hydrogenated rosin amine which comprises mixing at least two molecular proportions of a hydrogenated rosin amine dissolved in an inert solvent therefor with one molecular proportion of a complexogen metal salt of the group consisting of the acetate, nitrate, chloride, bromide, iodide, fluoride, propionate, stearate, and sulfate of the metals copper, zinc, chromium, mercury, silver, aluminum, manganese, iron, cobalt, nickel, calcium, and cadmium until a homogeneous solution is produced and then evaporating the solvent to leave the resinous complex as a residue.

11. The method of producing a resinous complex metal ammine salt of a dehydrogenated rosin amine which comprises mixing at least two molecular proportions of a dehydrogenated rosin amine dissolved in an inert solvent therefor with one molecular proportion of a complexogen metal salt of the group consisting of the acetate, nitrate, chloride, bromide, iodide, fluoride, propionate, stearate, and sulfate of the metals copper, zinc, chromium, mercury, silver, aluminum, manganese, iron, cobalt, nickel, calcium, and cadmium until a homogeneous solution is produced and then evaporating the solvent to leave the resinous complex as a residue.

GLENWOOD L. SCHERTZ.

REFERENCES CITED

The following references are of record in the file of this patent:

UNITED STATES PATENTS

| Number | Name | Date |
|---|---|---|
| 2,367,001 | Campbell | Jan. 6, 1945 |
| 2,382,337 | Schiller | Aug. 14, 1945 |
| 2,423,619 | Roon | Jan. 8, 1947 |